United States Patent
Aiello et al.

(10) Patent No.: US 7,088,795 B1
(45) Date of Patent: Aug. 8, 2006

(54) ULTRA WIDE BAND BASE BAND RECEIVER

(75) Inventors: Roberto Aiello, Palo Alto, CA (US); Carlton Sparrell, Palo Alto, CA (US); Gerald Rogerson, Morgan Hill, CA (US)

(73) Assignee: Pulse-LINK, Inc., Carlsbad, CA (US)

( * ) Notice: Subject to any disclaimer, the term of this patent is extended or adjusted under 35 U.S.C. 154(b) by 618 days.

(21) Appl. No.: 09/599,968

(22) Filed: Jun. 21, 2000

Related U.S. Application Data (63) Continuation-in-part of application No. 09/433,520, filed on Nov. 3, 1999, now Pat. No. 6,275,544.

(51) Int. Cl.
*H04L 7/00* (2006.01)

(52) U.S. Cl. .................. 375/356; 375/130; 375/326

(58) Field of Classification Search ........ 375/132–134, 375/136, 138, 141, 144, 145, 147, 149, 326, 375/130, 356
See application file for complete search history.

(56) References Cited

U.S. PATENT DOCUMENTS

| | | | |
|---|---|---|---|
| 3,668,639 A | 6/1972 | Harmuth | |
| 3,678,204 A | 7/1972 | Harmuth | |
| 3,728,632 A | 4/1973 | Ross | |
| 3,875,524 A | 4/1975 | Harzer et al. | |
| 4,201,892 A | 5/1980 | Schmidt | 370/104 |
| 4,232,339 A | 11/1980 | Smiley et al. | |
| 4,506,267 A | 3/1985 | Harmuth | |
| 4,574,378 A | 3/1986 | Kobayashi | |
| 4,586,177 A | 4/1986 | Kaul | 370/104 |
| 4,587,494 A | 5/1986 | Widlar | 330/273 |
| 4,641,317 A | 2/1987 | Fullerton | |
| 4,644,534 A | 2/1987 | Sperlich | |
| 4,651,152 A | 3/1987 | Harmuth | |
| 4,672,608 A | 6/1987 | Ball et al. | |
| 4,743,906 A | 5/1988 | Fullerton | |
| 4,763,325 A | 8/1988 | Wolfe et al. | |

(Continued)

FOREIGN PATENT DOCUMENTS

EP   0 307 962 A2   3/1989

(Continued)

OTHER PUBLICATIONS

Haykin, "An Introduction to Analog and Digital Communications", published by John Wiley & Son, Inc., 1989, pp. 197-198.*

(Continued)

*Primary Examiner*—Phuong Phu
(74) *Attorney, Agent, or Firm*—Pulse-LINK, Inc (57) ABSTRACT

The present invention is a receiver having a radio frequency (RF) front end, a pulse detector operatively coupled to the RF front end, and a data recovery unit operatively coupled to the pulse detector. The data recovery unit is configured to receive spread spectrum RF signals having different pulse repetition frequencies and using different modulation techniques. The receiver may operate in conjunction with a transmitter as a transceiver. The receiver may also operate in a networked environment in which a network of transceiver node devices comprise a first slave transceiver having a receiver configured to receive spread spectrum signals, and a second slave transceiver configured to communicate with the first slave transceiver. Additionally, a master transceiver is in communication with the first slave transceiver and the second slave transceiver. The master transceiver is configured to manage data transmissions and synchronization between the first slave transceiver and the second slave transceiver.

1 Claim, 6 Drawing Sheets

U.S. PATENT DOCUMENTS

| | | | |
|---|---|---|---|
| 4,813,057 A | 3/1989 | Fullerton | |
| 4,887,266 A | 12/1989 | Neve et al. | 370/95.1 |
| 4,979,186 A | 12/1990 | Fullerton | 375/23 |
| 5,134,408 A | 7/1992 | Harmuth | |
| 5,146,616 A | 9/1992 | Tang et al. | 455/103 |
| 5,148,174 A | 9/1992 | Harmuth | |
| 5,153,595 A | 10/1992 | Harmuth | |
| 5,159,343 A | 10/1992 | Harmuth | |
| 5,253,202 A | 10/1993 | Bronner et al. | 365/174 |
| 5,274,271 A | 12/1993 | McEwan | 307/108 |
| 5,307,079 A | 4/1994 | Ross et al. | 343/822 |
| 5,307,081 A | 4/1994 | Harmuth | |
| 5,319,218 A | 6/1994 | Kim et al. | 257/1 |
| 5,334,975 A | 8/1994 | Wachob et al. | |
| 5,355,374 A | 10/1994 | Hester et al. | 370/84 |
| 5,363,108 A | 11/1994 | Fullerton | 342/27 |
| 5,365,240 A | 11/1994 | Harmuth | |
| 5,473,668 A | 12/1995 | Nakahara | 379/58 |
| 5,493,691 A | 2/1996 | Barrett | |
| 5,519,400 A | 5/1996 | McEwan | |
| 5,523,758 A | 6/1996 | Harmuth | |
| 5,537,414 A | 7/1996 | Takiyasu et al. | 370/95.1 |
| 5,546,022 A | 8/1996 | D'Souza et al. | 326/87 |
| 5,586,145 A | 12/1996 | Morgan et al. | |
| 5,592,177 A | 1/1997 | Barrett | |
| 5,594,738 A | 1/1997 | Crisler et al. | |
| 5,610,907 A | 3/1997 | Barrett | |
| 5,627,829 A | 5/1997 | Gleeson et al. | 370/230 |
| 5,644,576 A | 7/1997 | Bauchot et al. | 370/437 |
| 5,675,388 A | 10/1997 | Cooper | |
| 5,677,927 A * | 10/1997 | Fullerton et al. | 375/130 |
| 5,687,169 A | 11/1997 | Fullerton | 370/324 |
| 5,687,200 A | 11/1997 | Berger | 375/363 |
| 5,715,236 A * | 2/1998 | Gilhousen et al. | 370/209 |
| 5,742,592 A | 4/1998 | Scholefield et al. | 370/329 |
| 5,748,891 A | 5/1998 | Fleming et al. | |
| 5,761,197 A | 6/1998 | Takefman | |
| 5,790,551 A | 8/1998 | Chan | 370/458 |
| 5,812,671 A | 9/1998 | Ross | |
| 5,815,537 A | 9/1998 | Janssen | 375/350 |
| 5,832,035 A | 11/1998 | Fullerton | 375/210 |
| 5,850,422 A | 12/1998 | Chen | |
| 5,886,652 A | 3/1999 | Adachi et al. | |
| 5,889,767 A | 3/1999 | Kimura | |
| 5,901,172 A | 5/1999 | Fontana et al. | 375/200 |
| 5,903,605 A | 5/1999 | Crittenden | |
| 5,909,469 A | 6/1999 | Frodigh et al. | 375/302 |
| 5,909,491 A | 6/1999 | Luo | |
| 5,920,278 A | 7/1999 | Tyler et al. | |
| 5,926,501 A | 7/1999 | Souissi et al. | 375/200 |
| 5,940,435 A | 8/1999 | Hendrickson | |
| 5,940,452 A | 8/1999 | Rich | 375/347 |
| 5,952,956 A | 9/1999 | Fullerton | 342/27 |
| 5,953,344 A | 9/1999 | Dail et al. | 370/443 |
| 5,960,000 A | 9/1999 | Ruszczyk et al. | 370/447 |
| 5,970,062 A | 10/1999 | Bauchot | 370/345 |
| 5,977,822 A | 11/1999 | Rybicki et al. | 329/313 |
| 6,002,708 A | 12/1999 | Fleming et al. | |
| 6,014,374 A | 1/2000 | Paneth et al. | 370/345 |
| 6,026,125 A | 2/2000 | Larrick, Jr. et al. | |
| 6,031,862 A | 2/2000 | Fullerton et al. | 375/200 |
| 6,041,051 A | 3/2000 | Doshi et al. | |
| 6,055,411 A | 4/2000 | Ishida et al. | 455/11.1 |
| 6,064,697 A | 5/2000 | Yoshikawa | |
| 6,067,648 A | 5/2000 | Hunter et al. | |
| 6,069,887 A | 5/2000 | Geiger et al. | |
| 6,091,717 A | 7/2000 | Honkasalo et al. | 370/329 |
| 6,094,464 A | 7/2000 | Ebringer et al. | 375/342 |
| 6,097,707 A | 8/2000 | Hodzic et al. | 370/321 |
| 6,097,766 A | 8/2000 | Okubo et al. | |
| 6,115,390 A | 9/2000 | Chuah | |
| 6,122,291 A | 9/2000 | Robinson et al. | |
| 6,133,875 A | 10/2000 | Kishimoto | 342/375 |
| 6,133,876 A * | 10/2000 | Fullerton et al. | 342/375 |
| 6,161,138 A | 12/2000 | Gross et al. | |
| 6,172,965 B1 | 1/2001 | Edwards et al. | |
| 6,177,903 B1 | 1/2001 | Fullerton et al. | |
| 6,178,217 B1 | 1/2001 | Defries et al. | |
| 6,181,687 B1 | 1/2001 | Bisdikian | |
| 6,212,230 B1 | 4/2001 | Rybicki et al. | |
| 6,226,277 B1 | 5/2001 | Chuah | 370/328 |
| 6,232,910 B1 | 5/2001 | Bell et al. | |
| 6,236,662 B1 | 5/2001 | Reilly | |
| 6,239,741 B1 | 5/2001 | Fontana et al. | |
| 6,243,372 B1 * | 6/2001 | Petch et al. | 370/350 |
| 6,243,583 B1 | 6/2001 | Tsutsui et al. | 455/442 |
| 6,246,377 B1 | 6/2001 | Aiello et al. | 343/770 |
| 6,246,702 B1 | 6/2001 | Fellman et al. | 370/503 |
| 6,275,500 B1 | 8/2001 | Callaway et al. | |
| 6,275,544 B1 | 8/2001 | Aiello et al. | 375/326 |
| 6,278,713 B1 | 8/2001 | Campbell et al. | 370/417 |
| 6,285,662 B1 | 9/2001 | Watanabe et al. | 370/280 |
| 6,285,873 B1 | 9/2001 | Quick, Jr. | 455/422 |
| 6,292,153 B1 | 9/2001 | Aiello et al. | |
| 6,300,903 B1 | 10/2001 | Richards et al. | |
| 6,310,865 B1 | 10/2001 | Ohki | |
| 6,324,397 B1 | 11/2001 | Adachi et al. | |
| 6,347,084 B1 | 2/2002 | Hulyalkar et al. | 370/347 |
| 6,351,468 B1 | 2/2002 | LaRowe et al. | |
| 6,351,652 B1 | 2/2002 | Finn et al. | |
| 6,385,461 B1 | 5/2002 | Raith | |
| 6,400,308 B1 | 6/2002 | Bell et al. | |
| 6,424,645 B1 | 7/2002 | Kawabata et al. | |
| 6,437,832 B1 | 8/2002 | Grabb et al. | |
| 6,449,265 B1 | 9/2002 | Prieto, Jr. | |
| 6,463,042 B1 | 10/2002 | Paatelma | |
| 6,477,171 B1 | 11/2002 | Wakeley et al. | |
| 6,480,505 B1 | 11/2002 | Johansson et al. | |
| 6,492,904 B1 | 12/2002 | Richards | |
| 6,497,656 B1 | 12/2002 | Evans et al. | |
| 6,505,032 B1 | 1/2003 | McCorkle et al. | |
| 6,510,150 B1 | 1/2003 | Ngo | |
| 6,519,460 B1 | 2/2003 | Haartsen | |
| 6,539,213 B1 | 3/2003 | Richards et al. | |
| 6,549,567 B1 | 4/2003 | Fullerton | |
| 6,574,266 B1 | 6/2003 | Haartsen | |
| 6,597,683 B1 | 7/2003 | Gehring et al. | |
| 6,603,818 B1 | 8/2003 | Dress et al. | |
| 6,621,857 B1 | 9/2003 | Belotserkovsky et al. | |
| 6,625,229 B1 | 9/2003 | Dress et al. | |
| 6,628,642 B1 | 9/2003 | Mile'n et al. | |
| 6,633,558 B1 | 10/2003 | Cho et al. | |
| 6,668,008 B1 | 12/2003 | Panasik | |
| 6,697,382 B1 | 2/2004 | Eatherton | |
| 6,704,311 B1 | 3/2004 | Chuah et al. | |
| 6,735,238 B1 | 5/2004 | McCorkle et al. | |
| 6,735,734 B1 | 5/2004 | Liebetreu et al. | |
| 6,747,959 B1 | 6/2004 | Ho | |
| 2001/0055353 A1 | 12/2001 | Rybicki et al. | |
| 2002/0018458 A1 * | 2/2002 | Aiello et al. | 370/348 |
| 2002/0131370 A1 | 9/2002 | Chuah et al. | |
| 2003/0054764 A1 | 3/2003 | McCorkle et al. | |

FOREIGN PATENT DOCUMENTS

| | | |
|---|---|---|
| EP | 0 817 399 A2 | 1/1998 |
| EP | 0 825 794 A2 | 2/1998 |
| EP | 0 817 399 A3 | 7/1998 |
| EP | 0 825 794 A3 | 1/2000 |
| EP | 0 307 962 A3 | 5/2000 |
| WO | WO 91/07030 A1 | 5/1991 |
| WO | WO 95/23461 A1 | 8/1995 |
| WO | WO 97/21294 A2 | 6/1997 |
| WO | WO 98/27670 A1 | 6/1998 |

| | | | |
|---|---|---|---|
| WO | WO 01/93434 A2 | 10/2001 | |
| WO | WO 02/31986 A2 | 4/2002 | |

OTHER PUBLICATIONS

J. Husted et al., "A Time-Division Multiple-Access System For The Defense Satellite Communication System", 1970 *Eascon*, pp. 229-237, Oct. 1970.

L. Roberts, "Aloha Packet System With and Without Slots and Capture", *Computer Communication Review*, vol. 5, No. 2, pp. 28-41, Apr. 1975.

"IEEE Standards for Local Area Networks: Carrier Sense Multiple Access with Collision Detection", ANSI/IEEE Std. 802.3-1985, The Institute of Electronic and Electrical Engineers, pp. 1-143, Dec. 1984.

B. Schneier, *Applied Cryptography*, Chapter 10, Sec. 10.3, 12.2, pp. 216-220, 270-278, John Wiley & Sons, Inc., Oct. 1995.

"Information technology-Open Systems Interconnection-Basic Reference Model: The Basic Mode", *ISO/IEC 7498-1:1994(E)*, pp. 1-59, corrected and reprinted Jun. 15, 1996.

"Radio Equipment and Systems (RES); High Performance Radio Local Area Network (HIPERLAN), Type 1 Functional specification", European Telecommunication Standards Institute, pp. 1-115, Dec. 1997.

M. Win, "ATM-Based TH-SSMA Network for Multimedia PCS", *IEEE Journal on Selected Areas in Communication*, vol. 17, No. 5, pp. 824-836, May 1999.

S. Ramsey et al., "A Wireless Photoconductive Receiver Using Impulse Modulation and Direct Sequence Code Division", *Microwave Photonics*, pp. 265-268, Nov. 17, 1999.

Fernando Ramirez-Mireles, "On Performance of Ultra Wideband Signals in Gaussian Noise and Dense Multipath," Paper 99C265, Accepted for Publication in the IEEE Transactions on Vehicular Technology, pp. 1-9.

Fernando Ramirez-Mireles et al., "N-Orthogonal Time-Shift-Modulated Codes for Impulse Radio," Communication Sciences Institute, Department of Electrical Engineering-Systems, University of Southern California, Los Angeles, CA 90089-2565 USA, pp. 1-4.

Henning F. Harmuth, "Fundamental Limits for Radio Signals With Large Bandwidth," IEEE Transactions on Electromagnetic Compatibility, vol. EMC-23, No. 1, Feb. 1981, pp. 37-43.

Henning F. Harmuth et al., "Large-Current, Short-Length Radiator for Nonsinusoidal Waves," IEEE International Symposium on Electromagnetic Compatibility, 1983, pp. 453-456.

Henning F. Harmuth, "Frequency-Sharing and Spread-Spectrum Transmission with Large Relative Bandwidth," IEEE Transactions on Electromagnetic Compatibility, vol. EMC-20, No. 1, Feb. 1978, pp. 232-239.

Henning F. Harmuth, "Applications of Walsh functions in communications," IEEE Spectrum, Nov. 1969, pp. 82-91.

Aether Wire & Location, Inc., Robert Fleming et al., "Integrated, Low-Power, Ultra-Wideband Tranceivers for Distributed Position Location and Communications," Technical Abstracts of Proposal to Defense Advanced Research Projects Agency (DARPA), Part I—Technical Proposal, 1998, pp. 1-52.

Aether Wire & Location, Inc., Robert Fleming et al., "Low-Power, Miniature, Distributed Position Location and Communication Devices Using Ultra-Wideband, Nonsinusoidal Communication Technology," Semi-Annual Technical Report Prepared for: ARPA/FBI, Jul. 1995, pp. 1-40.

"802.1D and 802.1Q Bridging Conformance" TA Document IEEE802.17-Jul. 11, 2001/040:3, 1394 Trade Association, 7 pages, Oct. 2001.

Dr. James P. K. Gilb, Wireless Multimedia . . . A Guide to the IEEE 802.15.3 Standard, Mar. 2004, pp. 42-63.

\* cited by examiner

ULTRA WIDE BAND BASE BAND RECEIVER

The present application is a continuation-in-part patent application of patent application Ser. No. 09/433,520 filed Nov. 3, 1999 now U.S. Pat. No. 6,275,544 titled "Baseband Receiver Apparatus and Method".

BACKGROUND OF THE INVENTION

1. Field of the Invention

This invention pertains generally to systems and methods for a wireless data receiver. More particularly, the invention relates to an ultra wideband receiver for receiving base band signals.

2. Description of the Background Art

Wireless communication increasingly relies on the transmission of data in digital formats. Typically, a data stream is modulated onto a carrier frequency, and the modulated carrier signal is transmitted over a communications channel from a transmitter to a receiver. Generally, these communication systems use conventional narrow band modulated carriers for wireless network communication.

There are important disadvantages associated with using conventional narrowband modulated carrier frequencies. Particularly, in multipath environments such as inside rooms and buildings, data communication degrades because of multipath propagation or fading and can result in poor signal reception. Further, the rapidly increasing use of wireless consumer products has "crowded the airwaves" and will result in increasing interference with reception of data. Still further, narrow band modulated carriers rely on use of relatively expensive components such as high-Q filters, precise local high-frequency oscillators, and power amplifiers.

Spread-spectrum signals for digital communications were originally developed and used for military communications either to provide resistance to jamming or to hide the signal by transmitting the signal at low power and, thus, make it difficult for an unintended listener to detect its presence in noise. More recently, spread-spectrum signals have been used to provide reliable communications in a variety of civilian applications, including mobile vehicular communications.

There are several types of spread spectrum signals. In one type, the basic elements of a spread spectrum digital communication system include a channel encoder, modulator, channel decoder, demodulator, and two synchronized sequence generators, one which interfaces with the modulator at the transmitting end and the second which interfaces with a demodulator at the receiving end. These two generators produce a binary-valued sequence that is used to periodically change the carrier frequency and thus spread the transmitted signal frequency at the modulator and to follow the carrier frequency of the received signals at the demodulator.

In carrier-based frequency-hopped spread spectrum the available channel bandwidth is subdivided into a large number of non-overlapping frequency slots. In any signaling interval the transmitted signal carrier occupies one of the available frequency slots. The selection of the frequency slots in each signal interval is made either sequentially or pseudorandomly according to the output from a pseudo-noise generator. The receiver tuning follows the frequency hopping of the transmitted carrier.

Another alternative spread spectrum communication system uses base band signals. In base band spread spectrum communication, information may be transmitted in short pulses, modulated by relatively simple keying techniques, with power spread across a frequency band. With the signal spectrum spread across a frequency band, frequency selective fading and other disadvantages of narrow band communication can be avoided. Base band technology has previously been used in radar applications, wherein a single short impulse is directed to a target. The short impulse, spread across a large bandwidth, has significantly reduced spectral power density and thus has a reduced probability of detection and interference.

Ultra wide band (UWB) is a wireless technology for transmitting large amounts of digital data over a wide spectrum of frequency bands with very low power. UWB is an extension of conventional spread spectrum technology. The major distinction is that while conventional spread spectrum signals require a few megahertz to about 20 to 30 MHz of bandwidth, UWB uses vastly more spectrum from a few megahertz to several gigahertz. Therefore, UWB communication systems broadcast digital pulses that are timed very precisely on a signal across a very wide spectrum. The transmitter and receiver must be coordinated to send and receive at the proper time. One of the applications for UWB is to allow low powered voice and data communications at very high bit rates.

The transmission and reception of digital data of short pulses over an UWB spectrum would avoid the problems associated with narrow band data communications, and the cost and complexity of spread spectrum communications. Suitable, cost effective receiver architectures for receiving such data transmissions, have heretofore been unavailable.

Accordingly, there is a need for a UWB base band receiver system and method which can receive data in the form of short UWB pulses which can be used with a network of transceiver node devices, which is not susceptible to multipath fading or interference with a narrowband communication system, which can be used for indoor applications, and which is relatively simple and inexpensive to implement. The present invention satisfies these needs, as well as others, and generally overcomes the deficiencies found in the background art.

Therefore, it would be beneficial to provide an invention having a base band receiver apparatus and method which efficiently receives data in the form of ultra-short, spread spectrum pulses.

It would also be beneficial to provide a baseband receiver system and method capable of receiving signals transmitted with different modulation methods.

It would be further beneficial to provide a baseband receiver system and method capable of receiving signals transmitted with variable pulse repetition frequencies.

It would be beneficial to provide a baseband receiver system and method capable of receiving signals transmitted using two different modulation methods such as on-off keying and pulse amplitude modulation.

It would be beneficial to provide a base band receiver apparatus and method which allows synchronization to a master clock of a remote master transceiver device in a multiple transceiver device network.

Further benefits of the invention will be brought out in the following portions of the specification, wherein the detailed description is for the purpose of fully disclosing the preferred embodiment of the invention without placing limitations thereon.

SUMMARY OF THE INVENTION

The present invention is a base band receiver system and method that receives and demodulates data transmitted, without a carrier frequency, as series of ultra-short, spread spectrum modulated electromagnetic pulses. The electromagnetic pulses each include a digital signal representative of a transmitted value. The receiver system advantageously converts the ultra-short, spread spectrum pulses directly to data without going through intermediate frequency (IF) down conversion. The elimination of IF down conversion allows reduced cost and easier fabrication of the receiver as a single chip device.

The receiver system and method is generally utilized in connection with a network of transceiver node devices, one of which acts as a "master" transceiver. The other transceivers are structured and configured as "slave" transceiver devices, each of which includes a receiver apparatus in accordance with the present invention. Data is transmitted in the form of short base band ultra wideband radio frequency (RF) pulses. The master transceiver manages data transmissions and synchronization between the slave node devices of the networked system.

The receiver system and method is capable of receiving signals using different modulation techniques and having different pulse repetition frequencies. By way of example and not of limitation, the different modulation techniques include on-off keying and pulse amplitude modulation. The receiver includes a decoder which takes values from an analog digital converter and converts these values to signals. For different modulation methods such as pulse amplitude modulation or on-off keying, the decoder is capable of detecting different threshold levels which identify the particular modulation method. This allows system transceivers to negotiate a link in bandwidth that depends on environmental issues such as bit error rate, signal to noise ratio and delay spread from receiving the signals. Additionally the reception of these signals allows different transceiver performance levels to operate on the same network. Thereby allowing backward compatibility to designed into the system and allowing newer devices to communicate with older devices using lower symbol frequency or fewer bits per symbol. The synchronization control for the various modulation methods is perform at the Medium Access Control (MAC) layer. To perform synchronization the MAC protocol communicates to an appropriate slot allocation unit the desired modulation scheme for the particular slot.

The receiver system and method is capable of receiving signals having variable pulse repetition frequencies. The receiver system comprises a phase locked loop module which detects changes in the sampling rate and communicates the changes in the sampling rate to a divider module. The divider module performs the function of determining when to sample and communicates this output to a sampling timer. The sampling timer receives signals from the divider module and the phase offset detector and determines when to sample the incoming signal.

The receiver system and method is also capable of negotiating variable pulse repetition frequencies. The receiver system for negotiating variable pulse repetition frequencies performs the negotiations at the MAC layer of the receiver. The receiver method for negotiating variable pulse repetition frequencies includes establishing a nominal pulse repetition frequency between communicating devices. The nominal pulse repetition frequency is the lowest common pulse repetition frequency. The devices then poll one another to determine optimal operating parameters. The devices then increase the pulse repetition frequency according to the optimal operating parameters.

Data transmission between the several transceiver node devices is preferably carried out via a MAC protocol utilizing a Time Division Multiple Access (TDMA) frame definition. The TDMA frame definition preferably comprises a master slot, a command slot, and a plurality of data slots.

In its most general terms, the receiver apparatus comprises an RF front end section, a pulse detection unit wherein modulated, ultra-short spread spectrum pulses are detected, and a data recovery unit wherein clock and data recovery from the detected pulses are carried out. The invention may be embodied in various hardware or circuitry configurations, and is preferably embodied in a single IC device.

The RF front end of the receiver apparatus generally comprises an antenna together with means for filtering and amplifying RF signals received by the antenna.

The pulse detection unit is preferably an envelope detection circuit, and preferably comprises a first amplifier, a high (GHz range) operating frequency detector diode, a high pass or band pass filter, a second amplifier, and a comparator. The data processing unit retrieves information from the detected pulses output by the envelope detection circuit. The clock recovery unit generally includes a mask for suppressing selected pulses.

BRIEF DESCRIPTION OF THE DRAWINGS

The present invention will be more fully understood by reference to the following drawings, which are for illustrative purposes only.

DETAILED DESCRIPTION OF THE INVENTION

Those of ordinary skill in the art will realize that the following description of the present invention is illustrative only and not in any way limiting. Other embodiments of the invention will readily suggest themselves to such skilled persons.

The present invention provides a Time Division Multiple Access (TDMA) system and method that allows sharing a wireless medium which can identify and operate in a variable bit rate environment. The present invention provides a system and method capable of supporting devices with vastly different bandwidth requirements. Some devices, such as a televisions, require high bandwidth data communication. The higher cost associated with a television allows for the design of a television having high data rate modulation techniques. Other device such as home thermostats have lower bandwidth requirements and require simpler modulation techniques for lower cost connectivity.

The present invention operates within a network which allows devices to operate at different bit rates and employ different modulation techniques and permits sharing of the same wireless medium. Additionally, the transceivers of the present invention are capable of negotiating links between one another which are dependent on environmental characteristics such as noise and reflection. Further still the present invention allows backward compatibility to be designed into the network so that newer devices communicate with older devices. The system preferable works in a base band or ultra wide band environment. However, the system and method may operate in other environments which use carrier signals.

Figure 1:
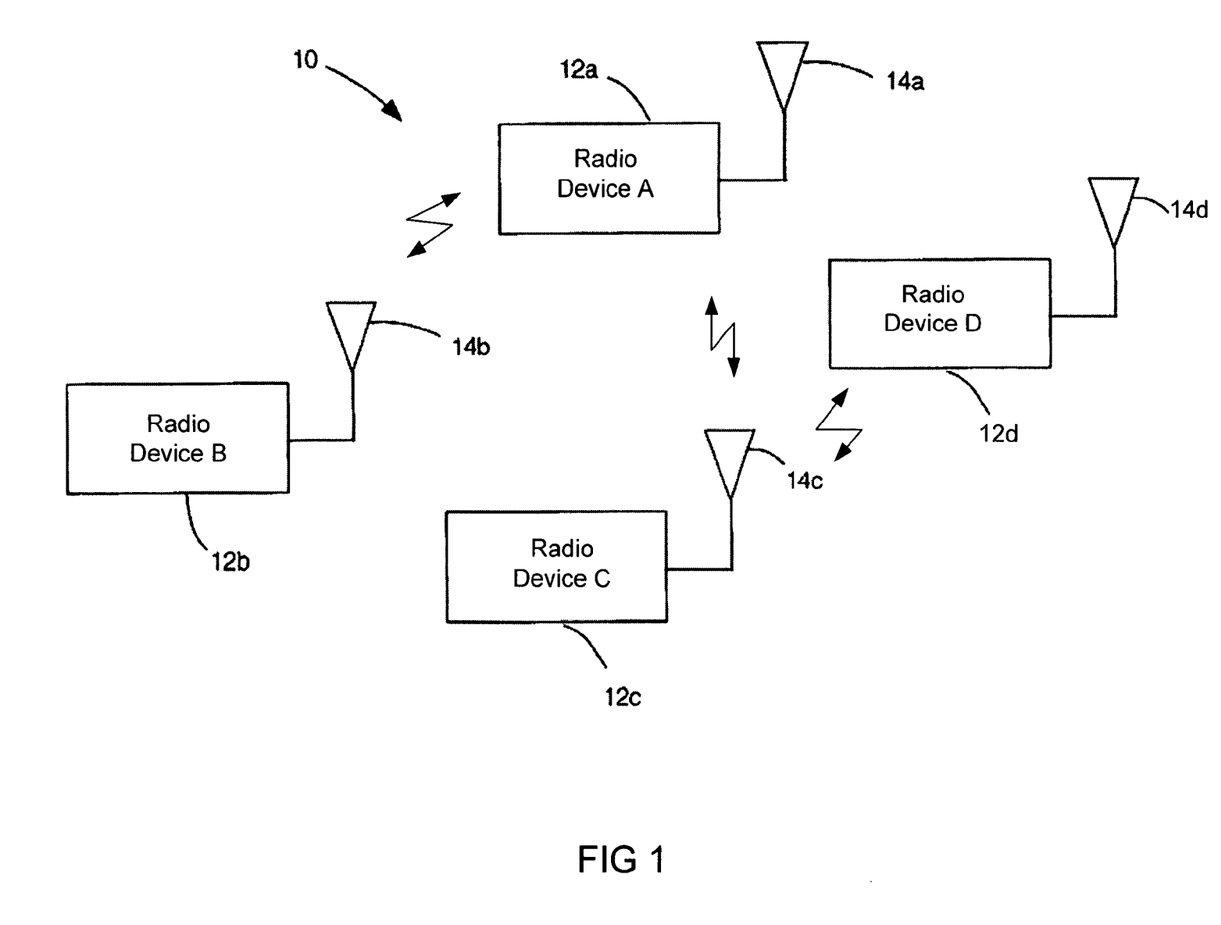
FIG. 1 is a functional block diagram of a multiple transceiver device network utilizing a receiver apparatus in accordance with the present invention.

The TDMA system and method of the present invention will be more fully understood by first referring to FIG. 1, which shows a wireless network system 10 comprising a plurality of mobile transceivers 12a–12d, also identified as radio devices A–D, wherein each transceiver has a corresponding antenna 14a–14d. One transceiver 12a is acting as a "master" transceiver or device, while the remaining transceivers 12b, 12c and 12d act as "slave" transceivers. It shall be appreciated by those skilled in the art that the terms transceiver and devices may be used interchangeably. The particular transceiver node 12a–12d which acts as the master transceiver may change depending upon the manner in which the network system 10 is used, and thus the components and hardware for each transceiver 12a–12d are generally the same.

By way of example and not of limitation, the illustrative example of four transceivers 12a–12d are shown in network system 10. The master transceiver 12a carries out the operation of managing network communications between transceivers 12b–12d by synchronizing the communications between the transceivers. Therefore, the master transceiver 12a maintains communication with slave transceivers 12b through 12d. Additionally, the slave transceivers are able to communicate amongst themselves, as illustrated by the typical communications between slave transceiver 12c and 12d. The systems and methods for communications are described in further detail below.

The present invention provides that the master transceiver need not include dedicated communication hardware to provide simultaneous open links between itself and all the slave transceivers. However, the master transceiver must maintain communications with the slave transceivers so that all transceivers on the network are properly synchronized. The present design guarantees that media can be broadcast to many nodes at the same time. It shall be appreciated by those skilled in the art and having the benefit of this disclosure, that the network system 10 may comprise a larger number of transceivers, with the actual number of transceivers in network system 10 varying depending on the particular application for the system 10.

Figure 2:
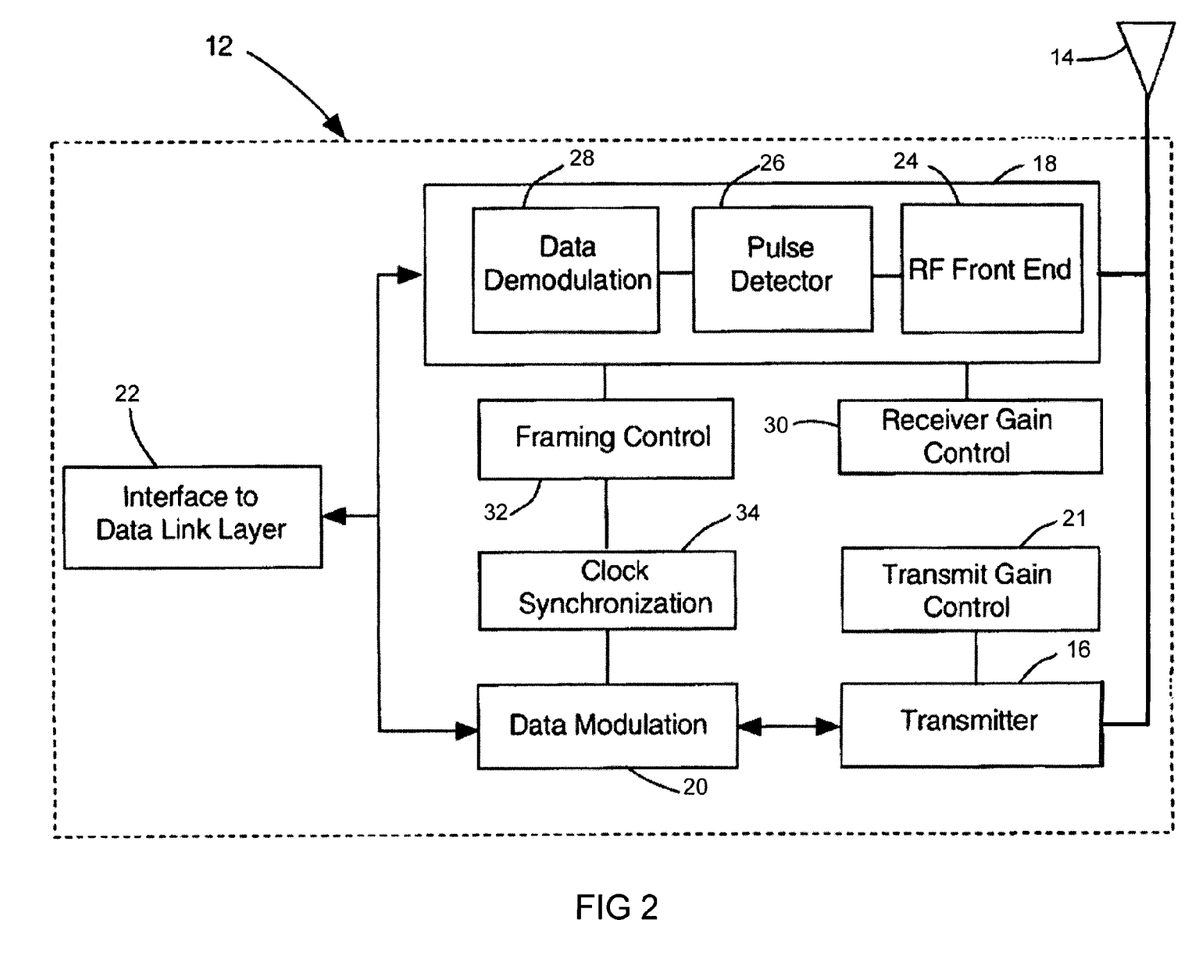
FIG. 2 is a function block diagram of a transceiver node showing a receiver apparatus in accordance with the invention.

Referring now to FIG. 2 as well as FIG. 1, a functional block diagram of the "Physical layer" implementation of a transceiver node device 12 in accordance with the present invention is shown. The "Physical layer" as described herein refers to the Physical layer according to the Open Systems Interconnection (OSI) Reference Model.

Each transceiver node device 12a–12d is structured and configured as transceiver device 12 of FIG. 2. The transceiver node device 12 comprises an integrated circuit or like hardware device providing the functions described below. Transceiver device 12 comprises an antenna 14 coupled to a transmitter 16 and a receiver 18. The transmitter 16 is connected to a data modulation unit 20. Transmitter gain control 21 is coupled to transmitter 16. Both the transmitter 16 and the data modulation unit 20 are coupled to an interface to Data Link Layer (DLL) 22. The receiver 18 coupled to the antenna 14 comprises generally an RF front end section 24, a pulse detector 26, a data demodulation or data recovery unit 28. A receiver gain control 30 is included in association with receiver 18.

A framing control unit 32 and a clock synchronization unit 34 are operatively coupled to the receiver 18 and the data modulation unit 20 associated with the transmitter 16. Transmitter 16 and receiver 18 are operatively coupled to antenna 14, preferably through a RF switch (not shown).

Data Link Layer interface 22 comprises circuitry and/or hardware which provides an interface or higher communication exchange layer between the Physical Layer of network 10, as embodied in transceiver 12, and the "higher" layers according to the OSI reference model. The layer immediately "above" the Physical Layer is the Data Link Layer. Output information from the Data Link Layer is communicated to data modulation unit 20 via interface 22. Input data from receiver 18 is communicated to the Data Link Layer via interface 22.

The data modulation unit 20 comprises circuitry and/or hardware which converts information received from interface 22 into an output stream of pulses. Various forms of pulse modulation may be employed by data modulator 20. One modulation scheme which may be used is on-off keying wherein the presence and absence of pulses respectively represent the "ones" and "zeros" for digital information. In this situation, data modulation unit 20 causes a pulse to be generated at the appropriate bit time to represent a "one", or causes the absence of a pulse to represent a "zero". In another embodiment, pulse amplitude modulation is employed wherein the amplitude of a pulse represents a digital value. The number of bits may be represented by a pulse depends on the dynamic range and signal-to-noise ratio available. The data modulation method is described in further detail below.

The pulse stream generated by data modulator 20 and transmitted by transmitter 16 is synchronized with a master clock associated with the clock synchronization function 34, and is sent in an appropriate time slot according to a frame definition provided by the framing control unit 32, as described further below. In order to maintain a synchronized network, one device must serve the function of being a clock master and maintaining the master clock for the network 10.

Transmitter 16 is preferably a wide band transmitter device which processes the pulse stream according to output from data modulation unit 20 and communicates the pulse stream via antenna 14 as a stream of electromagnetic radio frequency (RF) pulses. In the preferred embodiment, data is transmitted via impulses having 100 picosecond risetime and 200 picosecond width, which corresponds to a bandwidth of between about 2.5 GHz and 5 GHz. The transmitter gain control 21 preferably comprises a conventional automatic gain control loop (AGCL) circuit.

Antenna 14 comprises a radio-frequency (RF) transducer and is structured and configured for both transmission and reception. During reception, antenna 14 converts RF pulses into corresponding voltage signals. During transmission antenna 14 converts and electric current containing pulse information into corresponding baseband spread spectrum RF pulses. In one preferred embodiment, antenna 14 is structured and configured as a ground plane antenna having an edge with a notch or cutout portion operating at a broad spectrum frequency at about 3.75 GHz. The structure and configuration of antenna 14 may vary in order to accommodate various frequency spectrum ranges. Antenna 14 may alternatively comprise a "dual antenna" configuration wherein transmission and reception occur from different portions or regions of antenna 14.

Clock synchronization unit 34 includes a clock function (not shown) which maintains a clock or timing device (also not shown). The clock is preferably a conventional voltage controlled oscillating crystal device which operates at a multiple of the bit rate for the system 10. In the case of the master transceiver 12a, the clock in the clock synchronization unit serves as a master clock for network 10. As noted above, any transceiver node 12a–12d may act as the master transceiver for the network. A clock recovery function, described further below, is included with receiver 18 wherein timing information from the master clock is recovered.

Framing control unit 32 comprises hardware and/or circuitry which carries out the operations of generating and maintaining time frame information with respect to transmitted data. Framing control unit 32 is utilized by the transceiver node which is acting as the master transceiver by dividing up the transmitted pulse information into "frames". Data transmission between the several node transceivers 12a–12d is preferably carried out via a Medium Access Control protocol utilizing a Time Division Multiple Access (TDMA) frame definition.

Subject to the TDMA frame definition, data is transmitted as short RF pulses and is divided into discrete data frames, wherein each data frame is further subdivided into "slots". The frame definition is provided to transceivers 12a–12d from the Data Link Layer via interface 22. The TDMA frame definition is defined by Medium Access Control (MAC) sublayer software associated with the Data Link Layer. Framing control unit 32 in master transceiver 12a generates and maintains time frame information through use of "Start-Of-Frame" (SOF) symbols, which are used by the slave transceivers 12b–12d to identify the frames in the incoming data stream.

In the most general terms, the preferred receiver 18 includes a RF front end module 24, pulse detection unit 26, and a data demodulation unit 28. The receiver 18 detects modulated spread spectrum pulses generated by the transmitter. The receiver apparatus comprises a RF front end section 28, a pulse detection unit 26, and data recovery unit 24. A more detailed description of the preferred receiver of the present invention is provided below.

Transceiver 12 further includes hardware or circuitry providing means for controlling the gain of signals received and transmitted shown as gain control units 30 and 21, respectively. The transmit gain control unit 21 carries out the operation of controlling the power output of the transmitter 12 and receive gain control unit 30 carries out the operation of controlling the input gain of the receiver 18. The optimized gain for each control unit is dependent on maximizing the power demands for transceiver communications while minimizing the energy consumption of each control unit.

As described in further detail below, the physical layer of the system 10 includes a transmitter 16 and a data modulation unit 20, which is capable of modifying the pulse repetition frequency for the base band signals. The transmitter 16 is also capable of modifying the modulation scheme for the network 10 by shifting from on-off keying modulation to pulse amplitude modulation. Additionally, the receiver 18 is capable of detecting the variable pulse repetition frequency and different modulation techniques generated by the transmitter 16.

Figure 3:
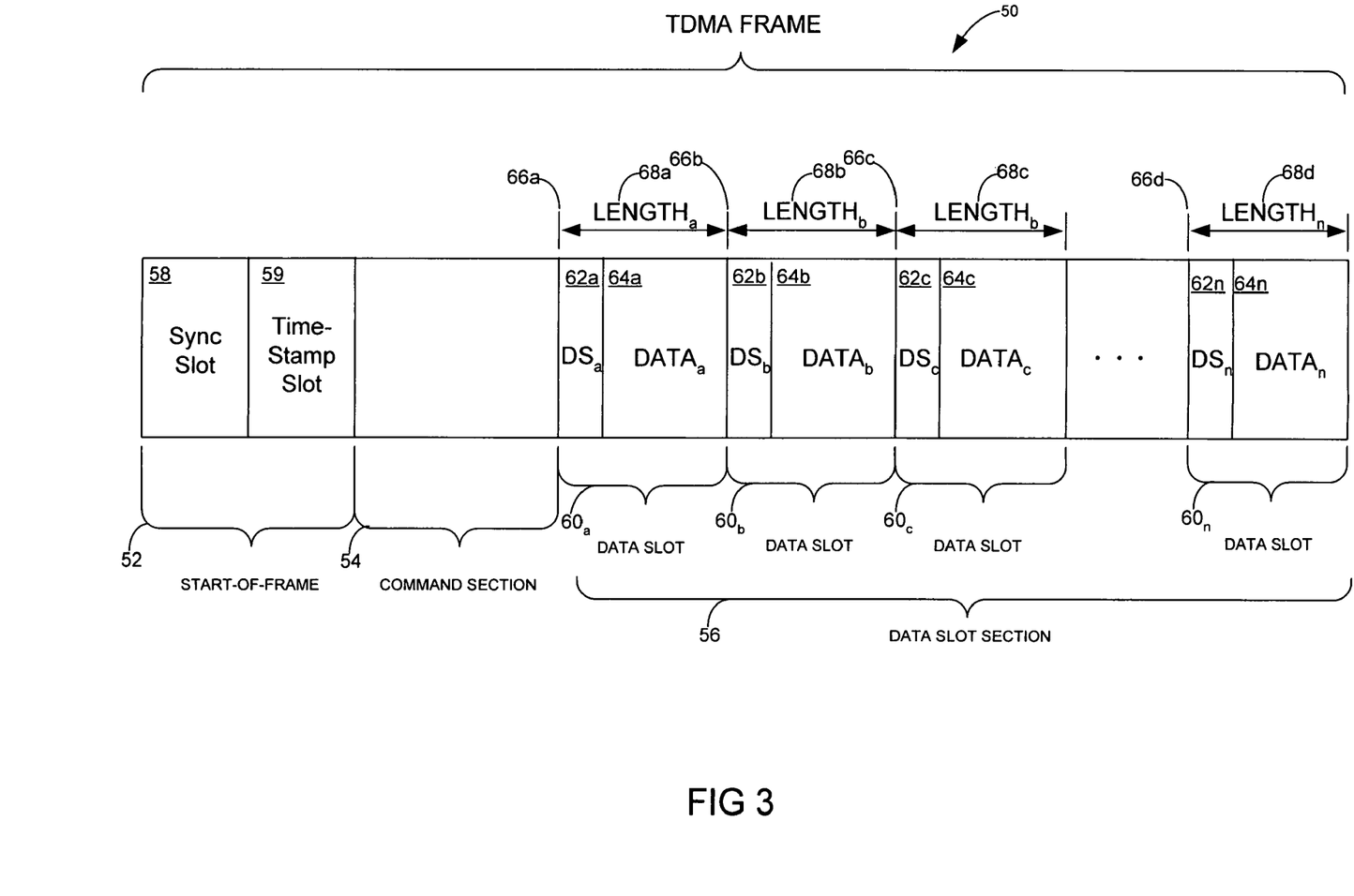
FIG. 3 is a schematic representation of a data frame as used in data transmission and reception in accordance with the present invention.

Referring to FIG. 3 there is shown an illustrative TDMA frame useable in the present invention. The TDMA frame 50 is an illustrative frame arrangement provided by the Medium Access Control (MAC) protocol of the present invention. The MAC protocol of the present invention provides services at the MAC sublayer of the Data Link layer according to the Open Systems Interconnection (OSI) reference model. The Logical Link Control (LLC) sublayer is the (upper) portion of the Data Link layer and provides virtual linking services to the Network layer of the OSI reference model. Data transmission framing for transceivers 12a–12d is provided by the MAC protocol executed within each transceiver on the network. The MAC protocol provides a TDMA frame definition and a framing control function. The TDMA architecture divides data transmission time into discrete data "frames". Frames are further subdivided into "slots".

TDMA frame 50 is an illustrative frame arrangement provided by the MAC layer protocol of the present invention. In general, the MAC layer of the present invention provides the master transceiver 12 with the functions and routines for carrying out the operation of managing each TDMA frame 50 which is communicated in the network system 10. In the preferred embodiment, the TDMA frame 50 comprises a Start-Of-Frame section 52, a command section 54, and a data slot section 56. The data slot section 56 is further subdivided into a plurality of data slots 60a through 60n.

The architecture of TDMA frame definition 50 provides for isochronous data communications between the master transceiver 12a and the slave transceivers 12b–12d. It shall be appreciated by those skilled in the art that isochronous data communication refers to processes where data must be delivered within a certain time constraint. Isochronous data communication is supported by frame definition 50 by sharing transmit time so that each transceiver 12a–12d is permitted to transmit data during a specific allotted time slot.

Asynchronous communication is also supported by the frame definition 50. It shall be appreciated by those skilled in the art that asynchronous data communications refers to communications in which data can be transmitted intermittently rather than in a steady stream. Within the TDMA frame, slots may be assigned to be random access using a technique such as Carrier Sense Multiple Access with Collision Avoidance (CSMA-CA). For the illustrative CSMA-CA case, the master 12a creates a slot to be used as a random access slot. The master 12a then communicates through the command slot to all random access capable devices that this slot is now available for random access. The master 12a also communicates the start and length of the command slot. The random access slot might be used for all Internet Protocol devices, for example, such that all IP capable devices will listen to and transmit using only the random access slot reserved for IP traffic. Each IP device on the network listens to this slot. If no communication is detected in this slot for certain number of frames, this channel is considered "free". A device wishing to transmit waits until the channel is free before retransmitting, and then start packet transmission by transmitting to the random access slot for each frame until the transmission was completed. Various schemes for collision avoidance are known in the art.

The Start of Frame section 52 includes a synchronization slot 58 and a timestamp slot 59. The synchronization slot 58 identifies the start of each new TDMA frame and synchronizes the master transceiver 12a with the slave transceiver 12b through 12d. The synchronization slot 58 from the master transceiver 12a includes a master synchronization code which is generated at least once per frame. Preferably, the master synchronization code comprises a unique bit pattern which identifies the master transceiver as the source of transmission with timing information associated with the master clock in the clock synchronization unit of the master transceiver. By way of example and not of limitation, the master synchronization code uses a 10-bit code comprising "0111111110", in which the master synchronization is preferably performed with on-off keying where 1's are represented as full amplitude pulses and 0's are represented by lack of pulses.

Various encoding schemes known in the art may be used to guarantee that the master synchronization code within synchronization slot 58 will not appear anywhere else in the data sequence of the TDMA frame 50. For example, a common encoding scheme is 4B/5B encoding, where a 4-bit values is encoded as a 5-bit value. Several criteria or "rules" specified in a 4B/5B, such as "each encoded 5-bit value may contain no more than three ones or three zeros" and "each encoded 5-bit value may not end with three ones or three zeros", ensure that a pulse stream will not have a string of six or more ones or zeros. Other encoding techniques known in the art may also be used for master synchronization code including bit stuffing or zero stuffing.

The timestamp slot 59 includes a bit-field which is incremented by a timestamp counter (not shown) in the master transceiver 12a. The timestamp slot is used by the master transceiver 12a and the slave transceivers 12b through 12d to coordinate the assignment or changes in slot parameters. The timestamp slot 59 permits the master 12a to dynamically reassign the data slot time and length parameters. In operation, the master 12a determines a predetermined time interval required for the modification of the data slot time and/or data slot length to the slave transceivers. Additionally the master schedules each participating slave device to make the switch to the new time/length at a specific time which is provided by a timecode resident in timestamp slot 59.

The command section 54 contains a protocol message exchanged between the transceivers 12a through 12d of network 10, are used by the master transceiver 12a for managing network communications. The flow of protocol messages in the command slot 42 may be governed, for example, by a sequence retransmission request or "SRQ" protocol scheme wherein confirmation of protocol transactions are provided following completion of an entire protocol sequence.

The data slots 60a through 60n are assigned by the master transceiver 12a to requesting slave transceivers 12b through 12d. Data slots 60a through 60n are further structured and configured to be arranged dynamically and permit the reassigning of the relative start time and the length of the data slots 60a through 60n within the data slot section 56 of the frame 50. This arrangement allows the master transceiver 12a to dynamically manage the usage of the data slot section 56 to optimize the bandwidth capabilities of the transport medium of the network and the transceivers of the network. Thus, the master transceiver 12a may allocate a wider data slot to a slave transceiver which can utilize a wider bandwidth. Conversely, the master transceiver 12a may also allocate a narrower data slot to a slave transceiver which has more limited bandwidth capabilities. The granularity for data slots 60a through 60n is one (1) symbol. The granularity for data slots 60a through 60n is allocated by the master transceiver 12a.

Each data slot 60a through 60n has a corresponding data synchronization sub-slot 62a through 62n and a data payload sub-slot 64a through 64n. The data payload 64a through 64n contains the encoded actual data or bit information which is transmitted from the source transceiver to the target transceiver. The data synchronization sub-slot 62a through 62n are used by each transceiver for providing timing synchronization signals to a corresponding target transceivers to accommodate for propagation delays between the source and target transceivers. Propagation delays vary in length depending on the distance between source and target transceivers. As described above, the master synchronization code provides timing signals to allow slave transceivers to synchronize with the master clock of the master transceiver 12a. Likewise, the symbols within the data synchronization sub-slot 62a through 62n are symbols which allow target slave transceivers to synchronize with corresponding source slave transceivers using similar synchronization algorithms such as phase offset detectors and controllers. Proper target to source transceiver synchronization is fundamental for reliable data communication exchange between the slave transceiver.

Each data slot 60a through 60n has a corresponding slot start time 66a through 66n and corresponding slot length 68a through 68n. The slot start time 66a through 66n corresponds to the time position within the data slot section 56 of the frame at which point the device begins its transmission. The slot length 68a through 68n measured from the slot start time provides the time position within the frame at which transmission is terminated for the data slot for each frame. The slot lengths 68a through 68n corresponds to the bandwidth allocated to the devices within the data slot section 56 of the frame and may be of varying lengths as assigned by the master transceiver 12a.

The framing control unit 32 in the slave transceivers 12b through 12d provide framing means such as local counters, correlators, phase lock loop functions, and phase offset detectors and controllers which allow frame synchronization between slave transceivers 12b through 12d and the master transceiver 12a to be reestablished when the size or length of frame 50 is altered by the master transceiver 12a.

Referring back to FIG. 1 as well as FIG. 3, each device operates as a finite-state machine having at least three states: offline, online and engaged. Each slave transceiver maintains and tracks its state by storing its state information internally, usually in random access memory (RAM) (not shown) or other memory means known in the art. The state of each slave transceiver is further maintained and tracked by the master transceiver 12 by storing the states of the slaves in a master table which is well known in the art and which is stored in RAM.

Each slave transceiver must first be registered with the master transceiver 12 before the slave transceiver may engage in data communication with the other slave transceivers of the network. Once a transceiver is considered "online" it is ready for communication. A slave transceiver that is in the "online" state is ready to send or receive data from the other devices on the network 10. Additionally, a slave transceiver is in the "online" state if it is not currently engaged in communication with other slave transceivers. A slave transceiver is "engaged" when the transceiver is currently communicating with one or more slave transceivers. For example, where a source slave transceiver is transmitting audio signal data to a target slave transceiver, both the source and target slave transceiver are in the "engaged" state.

The slave transceivers 12b through 12d use the command slot for requesting data transmission and indicating its start-up (on-line) state, engaged state, or shut-down (off-line) state. The data slots are used for data transmission between the node transceivers of the network. Generally, each transmitting device of the networks is assigned one or more corresponding data slots within the frame in which the device may transmit data directly to another slave transceiver without the need for a "store and forward" scheme as is presently used in the prior art.

Figure 4:
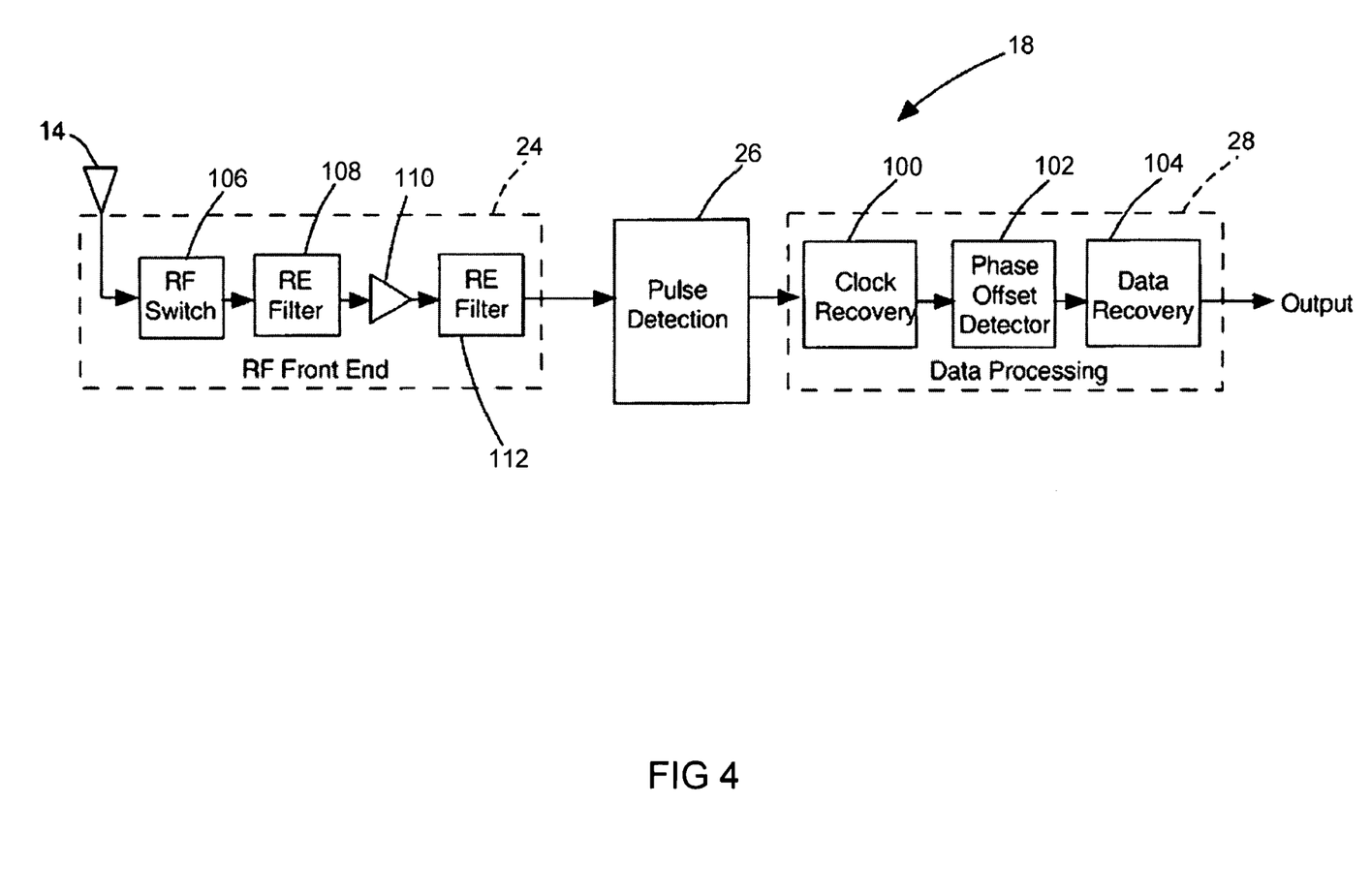
FIG. 4 is a functional block diagram of a receiver apparatus in accordance with the present invention showing the details of the RF front end.
Figure 5:
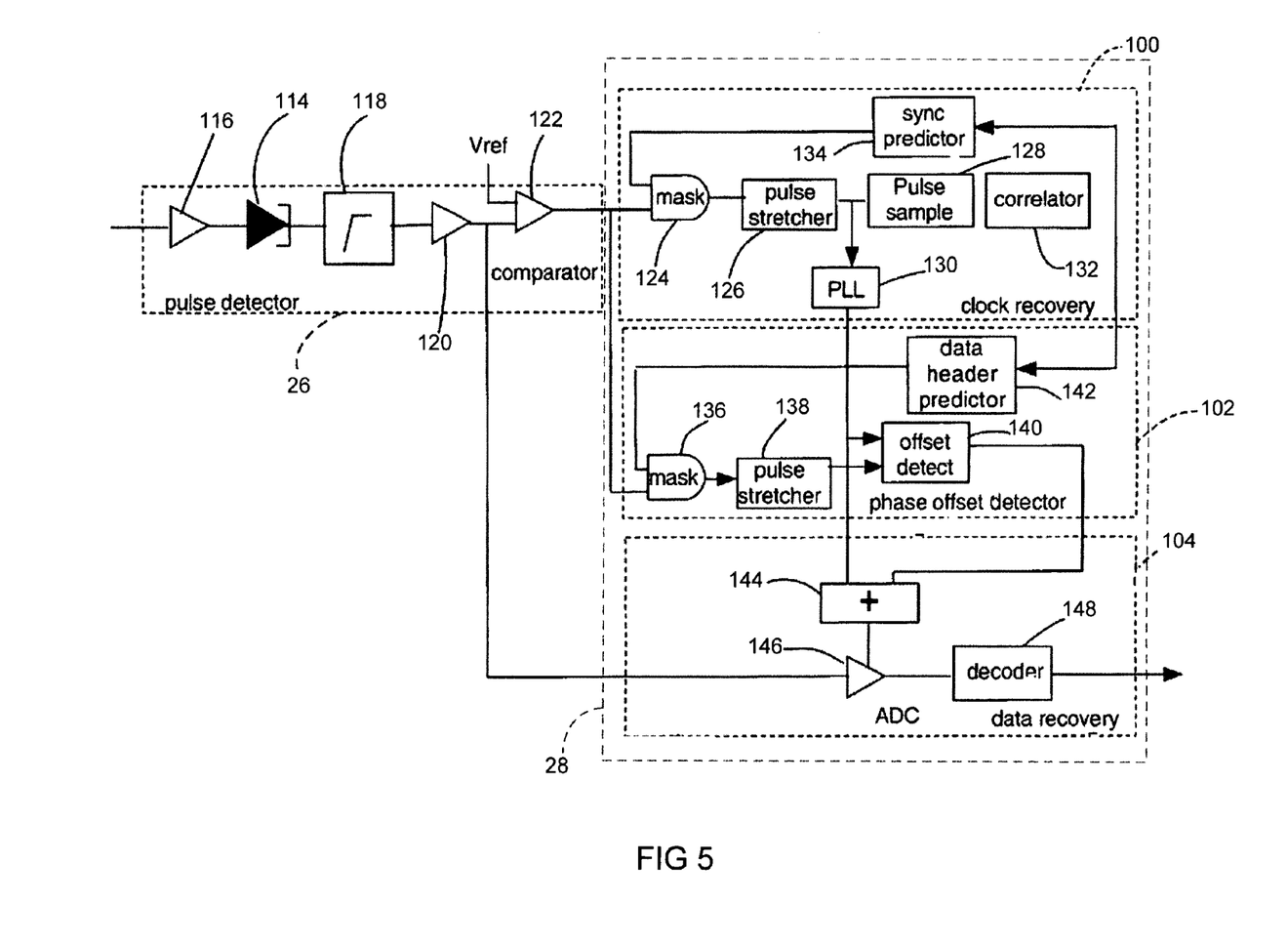
FIG. 5 is a functional block diagram of the pulse detector and data demodulation functions of the receiver apparatus of the invention.

With the above-described features of network system 10 in mind, reference is now made to FIG. 4 and FIG. 5, wherein the details of receiver apparatus 18 are illustrated. As noted above, receiver 18 comprises an RF front end section 24, a pulse detector 26 operatively coupled to or associated with front end section 124, and a data demodulation or processing function 28 which is operatively coupled to or associated with pulse detector 26. The data processing function further comprises a clock recovery function 100, a phase offset detector 102, and a data recovery function 104. The data recovery function 104 in conjunction with the clock recovery function 100 provides the receiver with the ability to distinguish changes associated with the pulse repetition rate and to the different modulation methods. FIG. 4 shows the details associated with RF front end section 24, while FIG. 5 shows the details of pulse detector 26 and data processing function 28. Receiver 18 may be embodied in various hardware or circuitry configurations, and is preferably embodied in a single IC device.

Front end section 24 converts RF pulse signals into "received" pulses in the form of filtered, amplified voltage pulse signals. Front end section 24 preferably comprises an RF switch 106 operatively coupled to antenna 14, a first frequency selective RF filter 108 operatively coupled to RF switch 106, at least one amplifier 110 operatively coupled to RF filter 108, and a second frequency selective filter 112 operatively coupled to amplifier 110. RF switch 106 is preferably a conventional antenna switching circuit which allows antenna 14 to be shared between the receiver 18 and a transmitter 16 of a transceiver device 12a through 12d. Filters 108, 112 preferably comprise conventional high pass or band pass LC circuit filters. Amplifier 110 is preferably a wide band, low noise, variable gain amplifier device.

The number and type of RF filters and amplifiers employed in front end 24 may vary depending upon the particular application of the invention. For example, a single RF filter 108 or 112 could be used alone and either positioned before or after amplifier 110. Since receiver 18 is not a narrow band device, it is possible to omit filters 108, 112 from front end 24 to minimize cost, although the omission of filters 108, 112 results in a reduction in the overall performance of front end 24. Receiver gain control 30 (FIG. 2) is preferably operatively coupled to amplifier 110 of front end 24. Receiver gain control 30 preferably comprises a conventional automatic gain control loop or AGCL circuit to prevent degradation of the signal-to-distortion level.

Antenna 14 is preferably a ground plane antenna having an edge with a notch operating at an ultra wideband frequency range. By way of example, the antenna 14 may have a frequency range of 2.5–5.0 GHz. Antenna 14 may alternatively comprise other types of base band spread spectrum antenna, including TEM "horns", waveguide horns, logconical spirals, cavity-backed spirals, or log-periodic dipole arrays. Antenna 14 may additionally have a "dual antenna" configuration wherein transmission and reception occur at different portions or sections of antenna 14. The use of such a dual antenna allows removal of RF switch 106 and provides a corresponding reduction in losses which are associated with RF switch 106. A dual antenna also allows variation of the impedance of the transmitter portion of the antenna without effecting the impedance of the receiver portion.

Referring to FIG. 5, there is shown a pulse detector 26 which recovers a stream of detected pulses from the voltage signals provided by RF front end 18. Pulse detector 26 preferably comprises an envelope detector, and more preferably comprises a detector diode-based envelope detector circuit. In this regard, pulse detector 26 includes a detector diode 114 which is operatively coupled to a first amplifier 116 and a frequency selective filter 118. The term "detector diode" as used herein is intended to encompass tunnel diodes, Schottky diodes or any other suitable high speed detector diode. Amplifier 116 is preferably a low noise, variable gain amplifier, and is operatively coupled to RF filter 112 of front end section 24. A second low noise, variable gain amplifier 120 is operatively coupled to filter 118, and a comparator 122 is operatively coupled to amplifier 120 and to a reference voltage source $V_{ref}$. Additional gain control in the form of an AGCL circuit (not shown) may be used in association with amplifier 116 or 120.

The voltage signals output from front end 24 are input to pulse detector 26, where they are amplified by amplifier 116 and directed to detector diode 114. Diode 114 is serially interfaced to amplifier 116 and high pass filter 118, with the anode end of diode 114 operatively coupled to amplifier 116 and RF front end 24, and with the cathode end of tunnel diode 114 operatively coupled to high pass filter 118. Diode 114 rectifies the voltage signal from front end section 24 to provide a stream of DC voltage peaks. High pass filter 118, which may comprise an LC filter circuit, is structured and configured to remove residual DC noise from the voltage pulse stream. An additional low pass filter (not shown) may be used in association with high pass filter 118 to filter out other noise components. The rectified pulse stream is amplified by amplifier 120. Comparator 122 acts as a threshold detector and compares each DC voltage peak in the pulse stream to the reference voltage and removes DC voltage peaks which fall below the reference voltage to provide a stream of detected pulses as output to the data processing function 28. High pass filter 118 removes all continuous wave (CW) interference from the detector output. Any sinusoidal voltage signals generally appears as a DC offset in the output of pulse detector 26. High pass filter 118 advantageously removes this DC offset and accordingly removes the interference.

The clock recovery function 100 of data processing function 28 provides for recovery of master clock timing information from the pulse stream output by pulse detector 26. As noted above, data transmissions within network 10 are provided in TDMA defined frames 50 which each include a synchronization slot 58 associated with the leading edge of each frame 50, and which is provided by the master transceiver of the network according to its internal master clock. Clock recovery function 100 identifies synchronization slot 58 for incoming data frames and synchronizes the local clock of the slave transceiver device.

Clock recovery function 100 includes a pulse suppressor or mask element 124, which is operatively coupled to voltage comparator 122 in pulse detector 26. An optional pulse dilation element or "stretcher" 126 is operatively coupled to mask element 124, and a pulse sampler 128 and phase lock element (PLL) 130 are operatively coupled to pulse stretcher 126. At least one correlator 132 is operatively coupled to pulse sampler 128, and a sync predictor element 134 is operatively coupled to correlator 132 and mask element 124.

Mask element 124 comprises circuitry which selectively masks or suppresses detected pulses, according to signals from sync predictor 134, which are not associated with synchronization slot 58. Pulse stretcher 126, which may be omitted, comprises circuitry which lengthens pulses to facilitate pulse sampling by digital logic in pulse sampler 128 and to improve processing gain. The digital logic circuit in sampler 128 preferably utilizes a flip-flop. Correlator 132 comprises circuitry which compares and matches pulses sampled by sampler 128 to known synchronization symbols, to determine the location of the synchronization slot 58 in the pulse stream. Sync predictor 134 comprises circuitry which generates mask signals, according to the predicted location of the synchronization slot 58, and provides mask signals to mask element 124 to suppress pulses which are not associated with the synchronization slot 58. Prior to matching a synchronization slot 58 to the incoming pulse stream by correlator 132, the mask signals are negated so that all pulses are sampled by sampler 128, as related further below.

Phase lock element 130 preferably comprises a conventional phase lock loop or delayed lock loop circuit having generally (not shown) a frequency reference, a reference divider, a phase detector (PSD), and a voltage controlled oscillator (VCO), the output of which is looped back to the PSD via digital control. Phase lock element 130 generates a first clock (not shown) equal in period to the pulse repetition, and a second clock (not shown) at a frequency multiple of the first clock for use in pulse sampling. Where the sync code predictor 134 has predicted an incoming synchronization slot 58 in the pulse stream sampled by sampler 128, PLL 130 compares the rising edge of the first bit clock to the incoming pulses of the predicted synchronization slot 58, and adjusts or matches the phase of the first clock to the phase of the incoming pulses. The phase adjustment is carried out by first using a coarse synchronization, wherein the period of the first clock is adjusted so that its rising edge is close in phase to the incoming pulses. Following coarse synchronization, PLL 130 uses its voltage controlled oscillator or a like circuit to measure the phase difference and adjust the clock rising edge in order to "lock" the local clock to the master clock. It shall be appreciated by those skilled in th art having the benefit of this disclosure that the PLL 130 in combination with the sync code predictor 134 is configured to detect varying pulse sampling rates by comparing an edge associated with an internal bit clock to the incoming pulses of the synchronization code in synchronization slot 58. The varying pulse sampling rates are communicated to divider circuit 143 which is described in further detail below.

The clock recovery function could alternatively utilize several duplicate circuits in parallel to speed up the locking process, particularly in "noisy" environments. With the use of multiple correlators, for example, if one correlator is attempting to correlate the synchronization slot 58 based on an invalid pulse, another correlator may commence matching the next incoming pulse, which may occur during the masking period of the first correlator.

The phase offset detector 102 of the data processing function 28 provides for determination of phase offset corrections associated with "peer-to-peer" communication between slave transceiver devices in a network. Referring again to FIG. 1, when a typical slave transceiver 12b receives a pulsed transmission directly from the master transceiver 12a, the incoming pulse stream can be sampled and recovered by slave transceiver 12b according to synchronization to the master clock of the master transceiver 12a via the synchronization slot 58. The slave transceiver 12b will be synchronized to pulses as received by the clock recovery unit 100, but the pulses are received at some time $t_1>0$ due to the time of flight propagation delay between transmission by the master transceiver 12a and reception by the slave transceiver 12b. When the slave transceiver 12b transmits to the master 12a, the master transceiver 12a will receive pulsed data subject to a round trip delay of $2t_1$ according to the rising edge of its own bit clock (the master clock).

In a system 10 with multiple slave transceiver devices 12b through 12d each slave device 12b, 12c and 12d can be synchronized to the master clock of the master transceiver 12a, but a different phase offset will be associated with the different time-of-fight propagation delays $t_1>0$, $t_2>0$, between the master transceiver 12a and slave transceivers 12b through 12d, respectively. For "peer-to-peer" communication between slave devices 12b and 12d, data demodulation and recovery from the pulse stream will need to take into account the different phase offsets associated with the time-of-flight propagation delays $t_1$, $t_2$, $t_3$ between master 12a and slaves 12b, 12c, and 12d as well as the phase offset associated with the time-of-flight propagation delay $t_4$, $t_5$, and $t_6$ between slave devices 12b and 12c, between 12b and 12d, and between 12c and 12d, respectively.

Referring again to FIG. 5 with the above in mind, phase offset detector 102 includes a mask element 136 which is operatively coupled to voltage comparator 122 in pulse detector 26. An optional pulse stretcher 138 is operatively coupled to mask element 136. An offset detector circuit 140 is operatively coupled to pulse stretcher 138 and to phase lock element 130 in clock recovery unit 100. A data header predictor 142 is operatively coupled to mask element 136, to PLL 130, and to correlator 132 in clock recovery unit 100.

As noted above, each data slot 60a through 60n in TDMA frame 50 includes a data header code 62a through 62n at a leading edge. Mask element 136 comprises circuitry which selectively masks or suppresses detected pulses, according to signals from data header predictor 142, which are not associated with data header codes 62a through 62n. Pulse stretcher 138, which is optional, comprises circuitry which lengthens pulses as described above for pulse stretcher 126. Correlator 132 in clock recovery 100 compares and matches pulses sampled by sampler 128 to known synchronization symbols as described above to determine the location of the data header codes 62a through 62n in the pulse stream. Data header predictor 142 comprises circuitry which generates mask signals, according to the predicted locations of the data header codes 62a through 62n, and provides mask signals to mask element 136 to suppress pulses which are not associated with data header codes 62a through 62n. Mask signals are negated prior to detection of data header codes 62a through 62n.

Offset detector circuit 140 comprises circuitry and digital logic which oversamples the incoming pulse stream and uses the location of the data header codes 62a through 62n in the pulse stream, together with the timing information from PLL 130, to determine phase offsets for each data slot 60a through 60n. In the presently preferred embodiment, the training sequence of the data header codes 62a through 62n comprises an illustrative training sequence "01111", and an average delay offset for each the "ones" is determined digitally, using oversampling with a counter (not shown) by offset detector 140, to determine a phase offset according to the synchronization slot 58 and data header codes 62a through 62n. The illustrative training sequence of "0111" is preferably performed with on-off keying where 1's represent full amplitude pulses and 0's are represented by a lack of pulses.

The data processing or recovery function 104 uses the phase locked clock information from PLL 130 of clock recovery function 100, and the phase offsets determined by phase offset detector 102, to sample the incoming pulse stream having a variable pulse repetition frequency at the appropriate, phase offset corrected times, and provide a digital value for each incoming symbol in the pulse stream. To determine the pulse repetition frequency in a variable pulse repetition frequency environment, the receiver includes a divider circuit 143 operatively coupled to PLL 130 in clock recovery function 100 and to a digitally controlled delay circuit or sampling timer circuit 144. In a variable pulse repetition frequency environment, the divider circuit 143 provides the function of determining the sampling rate for signals submitted to data recovery function 104. The divider circuit 143 divides the rate of data sampling according to the sampling rate detected by PLL 130. The divider circuit 143 communicates the data sampling rate to the delay circuit or sampling circuit 144.

The delay circuit or sampling circuit 144 is also coupled to an offset detector 140 in phase offset detector 102, and the sampling circuit 144 provides the function of determining when to sample the incoming data signals according to output generated by both the divider circuit 143 and the phase offset detector output 102. An analog-to-digital converter (ADC) 146 is operatively coupled to digitally controlled delay device 144 and to amplifier 120 of pulse detector 26. A decoder circuit 148 is operatively coupled to ADC 146 and to DLL interface 22 (FIG. 2).

As previously described, the phase locked clock output from PLL 130 are provided to divider circuit 143 which provides the function for selecting the sampling rate for the variable pulse repetition frequencies. As previously mentioned, the PLL 130 detected the sampling rate and phase offset output from offset detector 140 are provided to delay circuit 144 which determines sample timing. ADC 146 carries out sampling of incoming analog output from pulse detector 26 according to the timing provided by the sampling or delay circuit 144, and generates digital output signals.

Decoder 148 comprises circuitry which takes digital output signals from ADC 146 and converts the values to symbols wherein each symbol represents one or more bit values. For different modulation methods such as pulse amplitude modulation or on-off keying, the decoder is capable of detecting different threshold levels which identify the particular modulation method. In the case of on-off keying, the presence or absence of a pulse at the sampled time corresponds to a digital "one" or "zero", as related above. For on-off-keying modulation, ADC 146 may be a one-bit ADC, or alternatively, a comparator circuit. In the case of pulse amplitude modulation, decoder 148 utilizes quantization levels to determine the output value per measured voltage level. In one embodiment wherein pulse amplitude modulation is used, eight voltage levels are used to produce a three-bit value.

Where on-off-keying modulation is used, data recovery function 104 can utilize pulse detection output from voltage comparator 122. In this case, a mask element and pulse prediction circuit (not shown) may be used for data sampling, with mask signals generated to allow pulses to reach ADC 146 at appropriate sampling times according to the output from PLL 130 and offset detector 140. If a pulse occurs in the sampling window, a "one" is detected, and if no pulse occurs in the sampling window, a "zero" is detected.

Figure 6:
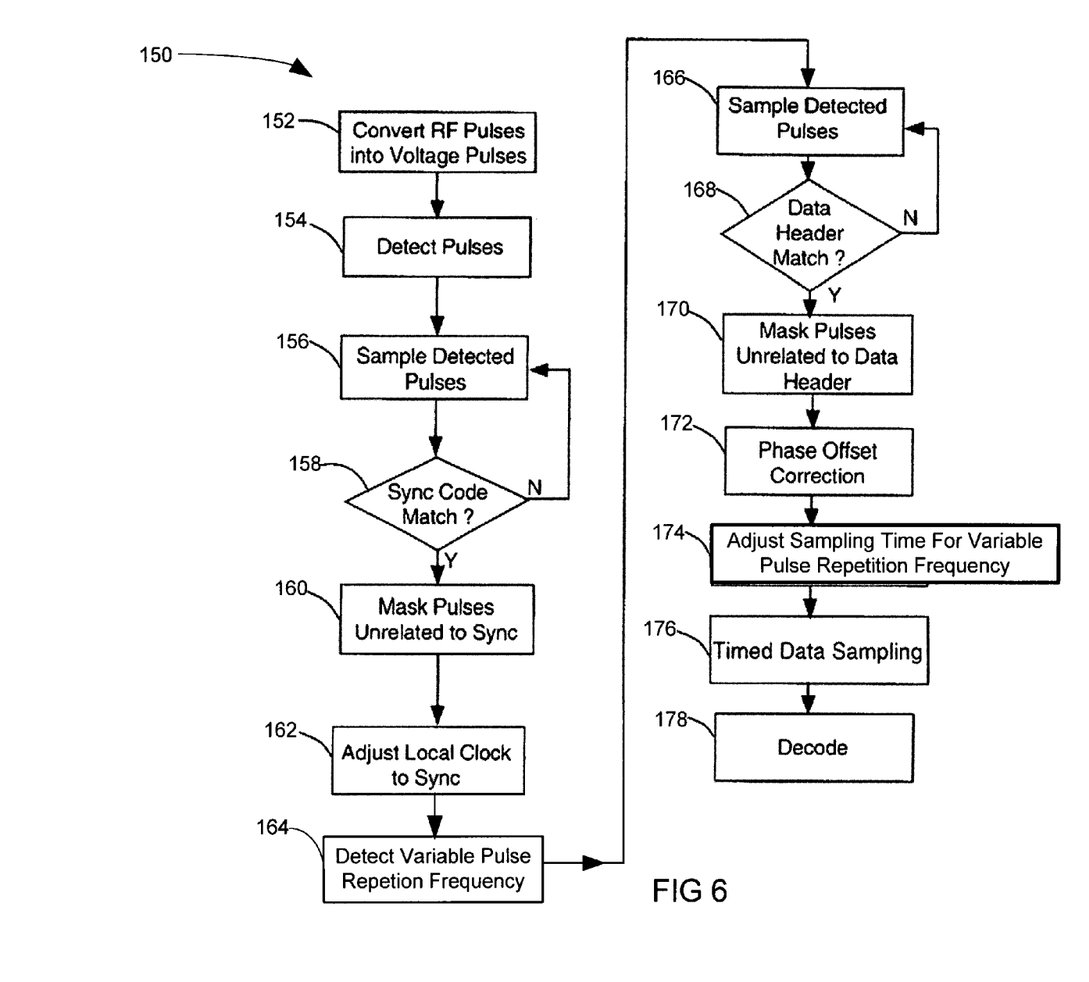
FIG. 6 is a flow chart illustrating the receiver method of the invention.

Referring to FIG. 6, as well as FIG. 1 through FIG. 5, the operations 150 performed by the physical layer of the invention is carried out as follows. At event 152, transmitted RF pulses are converted to corresponding voltage pulses which define generally a pulse stream. The receiver front end 24 receives a stream of short RF pulses which are arranged according to TDMA framing, with a synchronization slot 58 occurring once per data frame 50, and a data header code 60a through 60n occurring once per data slot. The RF pulses are converted in the front end 24 to a stream of filtered, amplified voltage pulses.

At event 154, the pulse detector 26 detects the pulses in the pulse stream from the front end 24 using a tunnel diode or Schottky diode 114 to rectify the pulse stream to DC voltage pulses and provide a power envelope, and a threshold voltage comparator 122 to remove pulses which fall beneath a predetermined voltage threshold. High pass filter 118 removes unwanted DC offset and related interference.

At event 156, detected pulses are sampled by the clock recovery function. The clock recovery function 100, while initially searching for pulses from detector 26, will negate the mask element 124 so that all detected pulses are directed to the pulse stretcher 126 and pulse sampler 128. The pulses are sampled by digital logic in the sampler 128 and passed to the correlator 132.

At event 158, a synchronization code match is performed. Correlator 132 compares the incoming pulse stream to a known synchronization slot 58 until a match is found. Multiple correlators may be used in parallel, as noted above. When a synchronization code match is found, the location of the synchronization code in synchronization slot 58 in the pulse stream is communicated to the sync code predictor 134. If a synchronization code match is not found, pulse sampling 156 is repeated.

At event 160, pulses which are unrelated to predicted sync codes are masked or suppressed. Synchronization code predictor 134 predicts the location, in the pulse stream, of subsequent synchronization code in the synchronization slot 58. The synchronization code predictor 134 then generates mask signals for the mask element 124 to suppress or mask out pulses except where a valid bit of a synchronization symbol is expected.

At event 162, the local clock of the receiver apparatus 18 is matched to the master clock via the synchronization code in the synchronization slot 58. Where the synchronization code predictor 134 has predicted an incoming synchronization code in the pulse stream, the PLL 130 compares the rising edge of its internal bit clock to the incoming pulses of the synchronization code in synchronization slot 58, and adjusts or matches the phase of the PLL bit clock to the phase of the incoming pulses. The phase adjustment uses a first, coarse synchronization wherein the period of the PLL bit clock is roughly matched in phase to the incoming pulses, and a second, finer synchronization wherein a VCO circuit adjusts the bit clock rising edge according to the measured phase difference or offset.

At event 164, the PLL 130 in combination with sync predictor 134 detects variable pulse repetition frequencies by comparing the edge of the bit clock to the incoming pulses associated with the synchronization code in synchronization slot 58.

At event 166, phase offset detector 102 samples pulses from pulse detector 26 for data header codes 62a through 62n in order to generate phase offset corrections according to timing information from PLL 130 and clock recovery function 100.

At event 168, a data header match is sought by data header predictor 142. Data header predictor 142 utilizes the synchronization code identified by correlator 132 to predict the location of data header codes 62*a* through 62*n* in the pulse stream. If a data header code location is not predicted, pulse sampling 166 is repeated.

At event 170, pulses unrelated to data header codes are selectively masked. Data header predictor 142 generates mask signals for mask element 136 to suppress pulses which are not associated with predicted data header codes 62*a* through 62*n*.

At event 172, phase offset corrections are made. Unmasked pulses from mask element 136 are dilated by pulse stretcher 138 and sampled by digital logic in offset detector 140, which determines a phase offset value for the data header code 62*a* through 62*n* (and corresponding data slot 60*a* through 60*n*) according to the timing output of PLL 130.

At event 174, sampling timing is adjusted for a varying pulse repetition frequency and for phase offset. For varying pulse repetition frequency a divider circuit 143 is operatively coupled to PLL 133. The divider circuit 143 determines the sampling rate for signals submitted to the data recovery function 104 and communicates the sampling rate to sampling timer circuit 144. Additionally, sampling timer circuit 144 in data recovery function 104 utilizes the master clock phase offset information from clock recovery function 100, with the phase offset values determined by phase offset detector 102, to determine phase corrected sampling times for the pulse stream from pulse detector 26.

At event 176, timed data sampling is carried out. ADC 146 samples the pulse stream at the appropriate sampling times according to master clock timing and phase offset information determined as related above. Decoding then occurs at event 180, where decoder 148 converts sampled values to digital symbols. The decoder 148 is configured to detect different modulation methods such as pulse amplitude modulation or on-off keying. The decoder 148 performs these operations by detecting different threshold levels which identify particular modulation methods, as described above. The output from decoder 148 is directed to DLL interface 22 (FIG. 2), for use in higher protocol layers of the network 10.

Accordingly, it will be seen that this invention provides a base band receiver apparatus and method which can receive data in the form of short, spread spectrum pulses, which can be used with a network of transceiver node devices, which is not susceptible to multipath fading or interference with narrow band communication systems, which can be used for indoor applications, and which is relatively simple and inexpensive to implement. Although the description above contains many specificities, these should not be construed as limiting the scope of the invention but as merely providing an illustration of the presently preferred embodiment of the invention. Thus the scope of this invention should be determined by the appended claims and their legal equivalents.

What is claimed is:

1. A network of transceiver node devices comprising:
    a first slave transceiver having a receiver configured to receive ultra-wideband spread spectrum signals;
    a second slave transceiver configured to communicate with said first slave transceiver; and
    a master transceiver in communication with said first slave transceiver and said second slave transceiver, said master transceiver configured to manage data transmissions and synchronization between the said first slave transceiver and said second slave transceiver by using ultra-wideband spread spectrum signals, the master transceiver comprising a master receiver including a radio frequency (RF) front end, a pulse detector operatively coupled to said RF front end, and a data recovery unit configured to receive spread spectrum RF signals having variable pulse repetition frequencies.

* * * * *